United States Patent Office 3,816,395
Patented June 11, 1974

3,816,395
ALKYL GLUCOSIDE REACTION PRODUCT
John P. Gibbons, Western Springs, and Lawrence Wondolowski, Lemont, Ill., assignors to CPC International Inc. Englewood Cliffs, N.J.
No Drawing. Filed Sept. 3, 1970, Ser. No. 69,440
Int. Cl. C07c 47/18, 69/32
U.S. Cl. 260—210 R      9 Claims

ABSTRACT OF THE DISCLOSURE

Polyurethanes derived from glycoside carbamate polyethers. The glycoside carbamate polyethers are prepared by the reaction of a glycoside such as methyl glucoside with urea and with an alkylene oxide such as propylene oxide. The polyurethanes have flame-retardant properties.

---

This invention relates to certain glycoside carbamates, to glycoside carbamate polyethers derived therefrom, and to polyurethane resins derivable from such polyethers. It relates also to methods of preparing these compositions.

Polyurethane resins have come into wide use within the past 20 years. They are prepared by the reaction of a polyisocyanate with a compound having an active hydrogen atom. Generally, such active hydrogen atom is attached either to an oxygen or a nitrogen atom, i.e., the active hydrogen-containing compound is an alcohol, a phenol, or an amine. The polyurethane resins are either flexible foams, rigid foams, elastomers, coatings, adhesives, or fibers. The invention of this application has to do primarily with rigid foams and, in particular, with flame-retardant rigid urethane foams. Flame resistance is of particular importance in application such as appliances, structural panels, transportation and the like. In many cases, approval of a urethane foam may be dependent upon meeting this requirement.

In general, there are three basic systems of foam preparation: the quasi-prepolymer system, the complete prepolymer system, and the one-shot system. The most generally used with respect to rigid foams at the present time probably is the quasi- or semi-prepolymer system, although the use of one-shot foams becomes increasingly more widespread. The quasi-propolymer system requires the reaction of a considerable molar excess of diisocyanate with a hydroxyl compound such as a polyether or a polyester to produce a reaction product which has a relatively large number of free isocyanate groups. This reaction product is reacted at the time of foaming with an additional amount of a hydroxyl compound, a gas-producing agent such as water or a volatile solvent, a surfactant, and a catalyst or a combination of catalysts.

In the complete prepolymer system, all of the hydroxyl compounds first are reacted with diisocyanate to give a product which, when combined with water and a catalyst, produces a foam having a density dependent on the free-isocyanate content and the amount of water used. The use of a complete prepolymer normally is limited to systems which are not highly cross-linked.

In the one-shot procedure, all ingredients, including diisocyanate, polyol, surfactant, water or volatile solvent, and catalyst, are combined at one time to produce the foam.

An increasingly important class of polyethers being used in the preparation of rigid urethane foams are the glycoside polyethers. These are prepared by the alkoxylation of an alkyl glycoside and their methods of preparation and uses in the production of urethane foams are described in U.S. Pat. 3,073,788.

The further development of such use, however, has encountered problems associated with the viscosity of the polyether; the viscosity of these materials is in general so high as to present problems of mixing and transport.

Another shortcoming is the relatively large amount of additional flame-retardant materials which must be added to urethane foams prepared from these polyethers, if the desired degree of flame-retardancy is to be achieved.

It is accordingly a principal object of the present invention to provide improved polyurethane resins.

It is another principal object of the present invention to provide a method for the preparation of such improved polyurethane resins.

It is also a principal object of the present invention to provide improved flame-retardant compositions.

It is also a principal object of the present invention to provide polyethers which are useful in the preparation of such polyurethane resins.

It is also a principal object of the present invention to provide relatively non-viscous polyethers which are useful in the preparation of polyurethane resins.

These and other objects are accomplished by the invention of this application which comprises a glycoside carbamate having the formula $GA_nR$ wherein G is a glycoside residue, A is a carbamate, $n$ is 1, 2, 3 or 4, and R is alkyl, hydroxyalkyl, or aralkyl. Such glycoside carbamate may be reacted with an alkylene oxide in the usual manner to produce a glycoside carbamate polyether. Such polyether is significantly less viscous than the glycoside polyethers of the prior art; furthermore, the preparation of flame-retardant polyurethane materials from such glycoside carbamate polyethers requires the use of much less of the more expensive phosphorous containing reactants normally used in the production of flame-retardant materials.

The glycoside carbamates may be prepared by reaction of an alkyl, hydroxyalkyl, or aralkyl glycoside with urea.

The term "glycoside" as used herein refers to a non-reducing monosaccharide in which an alkyl, hydroxyalkyl, or aralkyl radical corresponding to R in the above formula, is attached to a carbonyl carbon atom through an oxygen atom. The term "non-reducing monosaccharide" denotes a simple sugar which does not reduce Fehling's solution. Such R group has from 1 to 8 carbon atoms, including methyl, ethyl, propyl, isopropyl, n-butyl, isobutyl, tertiary amyl, hexyl, and 2-ethylhexyl. The aralkyl group may be, for example, benzyl. The sugar constituent of the glycoside is derived from a pentose such as xylose, lyxose, arabinose, ribose; a hexose such as glucose, mannose, altrose, talose, alactose, idose, glucose, fructose, allose, psicose, sorbose and tagatose; or a desoxy derivative formed by the replacement of a hydroxyl substituent in the sugar with hydrogen such as the desoxy hexoses, rhamose and fructose. The sugar constituent can be in the furanoside or pyranoside form of acetal structure.

Suitable glycosides for the purposes of this invention include the alpha and beta forms of methyl-D-arabinoside, methyl-D-xyloside, ethyl-D-xyloside, n-butyl-D-riboside, methyl, ethyl, propyl, butyl, and 2-ethylhexyl-D-glycoside, 2-ethylhexyl-D-fructoside, isobutyl - D - mannoside, ethyl-D-galactoside, benzyl-D-glucoside, and methyl-L-rhammoside. The preferred glycosides are the alkyl glycosides, and preferably the lower alkyl glycoside in which the alkyl group contains from 1 to 6 carbon atoms.

The above glycosides may be prepared by reaction of a simple sugar with an appropriate alcohol in the presence of an acid catalyst or by replacement of the halogen atom of tetraacetylglycosyl halides followed by saponification of the acetyl groups. Thus, methyl glucoside may be prepared by the reaction of glucose with methyl alcohol, and benzyl mannoside by the reaction of mannose with benzyl alcohol.

Reaction of the glycoside with urea is effected at elevated temperatures, i.e., within the range of about 80° C. to about 200° C. Generally, the reaction is carried out within the range of from about 130° C. to about 190° C. Little or no biuret is formed, as might be expected when urea is heated to such temperatures.

Varying amounts of urea may be used, depending on whether a mono-, di-, tri-, or tetra-carbamate derivative of the glycoside is desired. In some instances, it is desirable to use less than one mole so as to obtain a mixture of unreacted glycoside and glycoside carbamate. Such a mixture may then be employed in preparing a polyether composition which in turn may be used to prepare a desirable polyurethane resin. A particularly preferred polyurethane resin may be prepared from a polyether of a methyl glycoside carbamate wherein two carbamate groups are present. Such a glycoside carbamate is prepared by the reaction of methyl glucoside with about two moles of urea. The amount of urea to be used may range from about 0.1 mole to about 4.0 moles per mole of alkyl glycoside.

Although the reaction proceeds suitably without a catalyst, the use of a catalyst is preferred because of its favorable influence upon the course of the reaction. A wide variety of alkali materials are effective as catalysts, including alkali metal bases such as sodium hydroxide, potassium hydroxide, lithium hydroxide, sodium methoxide, potassium ethoxide, sodium ethoxide, sodium amide and the like; alkaline earth metal bases such as calcium oxide, calcium hydroxide, barium oxide, barium methylate, calcium methylate, strontium oxide, magnesium hydroxide and the like; other metal bases such as litharge, zinc oxide and stannous oxide; and tertiary amine such as triethylamine, tri-n-butylamine and the like. The relative proportion of such a catalyst may vary within the range of from about 0.05 to about 5.0% based upon the weight of the reaction mixture.

The reaction proceeds with the evolution of ammonia and, while not necessary to the success of the reaction, it is desirable to subject the reaction mixture to slightly reduced pressure so as to facilitate removal of such evolved ammonia. For each mole of urea used in the reaction, one mole of ammonia is evolved. In general, the reaction is carried out simply by mixing the reactants at the indicated temperature until no more ammonia is evolved. Generally, this requires from 2 to 10 hours. The preparation of a glycoside carbamate is illustrated by the reaction of methyl glucoside with urea, as shown by the following equation:

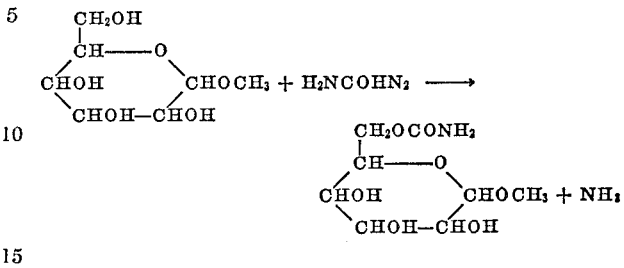

The above equation assumes that the first molecule of urea reacts with the hydroxyl group attached to the No. 6 carbon atom of the methyl glucoside, and while this may not be the case, in any event, the above equation is illustrative. A second molecule of urea reacts with one of the other three hydroxy groups of the methyl glucoside, and a third molecule would react similarly with another of these hydroxy groups. The complete reaction with four molecules of urea would yield a tetracarbamate having no free hydroxyl groups.

The glycoside carbamate polyether is prepared by reaction of a glycoside carbamate as above, with an alkylene oxide. The alkylene oxide may contain up to and including 8 carbon atoms, e.g., it may be ethylene oxide, propylene oxide, butylene oxide, or the like, or mixtures of these. The reaction is carried out preferably under substantially anhydrous conditions so as to minimize the formation of polymers of the alkylene oxide at the expense of the desired reaction product. The reaction mixture usually is agitated, either at atmospheric conditions or, preferably, at superatmospheric pressure, and generally the reaction is carried out in an autoclave. The temperature should be within the range of from about 80° C. to about 200° C. The relative proportion of alkylene oxide used in the preparation of these polyethers is sufficient to yield a product having a molecular weight within the range of from about 360 to about 5,000. In terms of alkylene oxide, this corresponds to a range of from about 2 moles to about 100 moles, per mole of glycoside carbamate. In general, the relative proportion of alkylene oxide will be from about 4 to about 80 moles, preferably less than about 20 moles, per mole of glycoside carbamate. The reaction mixture preferably is liquid and, in some instances, it is desirable to slurry the reactants in an inert solvent such as toluene, xylene or other hydrocarbon solvent. The use of a catalyst is advisable and any of the well-known catalysts for this type of reaction are useful. Alkaline catalysts are preferred, including alkali metal hydroxides and alcoholates, and tertiary amines. Illustrative examples are sodium hydroxide, sodium methoxide, potassium hydroxide, potassium butoxide, triethyl amine, pyridine and the like. The amount of catalyst may range from about 0.002% to 5.0% by weight, based on the total reaction mixture. The catalyst may be added all at once at the beginning of the reaction, or in increments throughout the course of the reaction.

The precise structure of the glycoside carbamate polyethers is not known, although it is believed that the alkylene oxide reacts both with the hydroxyl groups and the amino group of the glycoside carbamate. It may be represented as $GA_n(OR')_xR$ wherein G is a glycoside residue, A is a carbamate, $n$ is one, two three or four, R' is lower alkylene or aryl-substituted lower alkylene, $x$ is an integer ranging from about 4 to about 80, and R is alkyl, hydroxyalkyl or aralkyl.

The alkylene oxides contemplated for use herein include those lower alkylene oxides having up to and including six carbon atoms, and styrene oxide. Ethylene oxide and propylene oxide are preferred.

A preferred method of preparing the glycoside carbamate polyethers involves the *in situ* preparation of the alkyl glycoside carbamate. The urea, alkyl glycoside and an alkaline catalyst are mixed and heated to the desired temperature, i.e., from about 80° C. to about 200° C., then the alkylene oxide is introduced into this mixture. As the urea reacts with the glycoside, ammonia is evolved as a by-product. This ammonia in turn reacts with alkylene oxide to form the corresponding trialkanol amine. The presence of this trialkanol amine polyether polyol in the product mixture is desirable because it contributes to a lower viscosity. Furthermore, the basicity of this by-product reduces the amount of relatively expensive amine catalyst required in the formation of polyurethanes by reaction of an organic polyisocyanate with such final polyol product.

Any of the conventionally used polyisocyanates or mixtures thereof can be used in making polyurethane resins from the polyols prepared as above. Also, any of the conventional blowing agents, catalysts, surfactants, and flame retardant additives used in preparing and formulating such polyurethane resins likewise are useful for the purposes of this invention.

The invention is illustrated further by the following examples which, however, are not to be taken as limiting in asy respect. All parts are by weight unless otherwise expressly stated.

EXAMPLE 1

Preparation of Alkyl Glycoside Carbamate

A 3-necked flask equipped with a stirrer thermometer and an outlet tube leading to a vacuum source is charged with 291 parts (1.5 moles) of methyl glucoside, 180 parts (3.0 moles) of urea and 1.7 parts of sodium methoxide (catalyst). The resulting mixture is heated with agitation at 160° C./170° C. for eight hours, under reduced pressure. The resulting mixture is a clear, brown glassy solid weighing 424 grams. Analysis of this product shows a nitrogen content of 10.0% (theory: 10.0%), a periodate consumption of 1.2 moles (theory, for a methyl glucoside 2,6-dicarbamate derivative: 1.0 mole), and a negative biuret test. The periodate consumption provides a measure of the relative proportion of pairs of hydroxyl groups attached to adjacent carbon atoms. Periodic acid reacts with such carbon atoms cleaving the carbon-to-carbon bond and oxidizing the carbinol groups to carboxyl groups. One mole of periodic acid will oxidize one such pair of carbon atoms.

EXAMPLE 2

Reaction of Alkyl Glycoside Carbamate with Propylene Oxide

A stainless steel autoclave equipped with a turbine agitator, thermocouple and gas inlet tube is charged with 367 parts (1.0 mole) of a 76.4% aqueous solution of the methyl glucoside dicarbamate product of Example 1, then heated under reduced pressure until substantially all of the water is removed. At this point, 3.7 parts of tetramethylethylenediamine is added and the atmosphere above the mixture is sparged with nitrogen. Thereupon, propylene oxide is introduced through the gas inlet tube throughout a period of 1.25 hours, the temperature being maintained at 150° C.–184° C. and pressure at 37–38 p.s.i.g., until a total of 393 parts (6.77 moles) has been added. After the pressure has leveled off, the tetramethylethylenediamine is removed by distillation at reduced pressure. The residual product mixture has a Gardner-Hellige color rating of 11–12, a hydroxyl number of 624, and a viscosity of 26,750 cps. at 24.5° C.

A Gardner-Hellige color rating is determined by visual comparison of a sample with rated standards varying from water-white (1) to a very dark amber (18).

EXAMPLE 3

In Situ Preparation of Alkyl Glycoside Carbamate

To a stainless steel autoclave equipped with a turbine agitator, thermocouple and a gas inlet tube, there is added 388 parts (2 moles) of methyl glucoside, 240 parts (4 moles) of urea and 1.94 parts of potassium hydroxide (catalyst) dissolved in 10 ml. of methanol. The methanol then is evaporated at reduced pressure, the autoclave sealed, its contents heated to 120° C. and the addition of propylene oxide begun. The propylene oxide is added at a temperature of 120° C.–150° C. and pressure of 20–40 p.s.i.g., for eight hours, at which point 465 grams (8 moles) of propylene oxide has been added. After the pressure has leveled off, unreacted propylene oxide is removed by evaporation at reduced pressure, the autoclave is pressurized with nitrogen and its contents are discharged. The product weighs 1,090 grams (theory: 1,094 grams), has a hydroxyl number of 858, and a nitrogen content of 9.62% (theory: 10.3%). A portion of the above product (300 grams) is subjected to vacuum distillation at 170° C.–190° C./3–7 mm. for 4.5 hours. The resulting distillate weighs 146 grams, is colorless, and is relatively non-viscous. Its pH is 9.8 and its hydroxyl number is 488. Gas chromatographic analysis shows it to contain a mixture of 3.4% monoisopropanolamine, 10.4% diisopropanolamine and 87.3% triisopropanolamine.

EXAMPLE 4

Preparation of Alkyl Glycoside Urea Polyether Polyol

To a stainless steel autoclave equipped with a turbine agitator, a thermocouple and a gas inlet tube, there is added 450 grams (2.32 moles) of methyl glucoside, 50 grams (0.835 moles) of urea, and 5.85 grams of potassium hydroxide (catalyst). The resulting mixture is heated to 120° C. with stirring and propylene oxide then introduced through the gas inlet tube. The temperature is maintained at 120° C.–180° C. and the pressure at 35–40 p.s.i.g. A total of 914 grams (15.76 moles) of propylene oxide is added throughout a period of 6.67 hours. After the pressure has leveled off, unreacted propylene oxide is removed by evaporation at reduced pressure. Thereupon, 6.8 grams of tartaric acid is added to precipitate the potassium catalyst as an insoluble tartrate which is removed by filtration. The product weighs 1400 grams (99% of the theory), has a hydroxyl number of 470, a Hellige Color of 5, and a viscosity of 24,400 cps. at 25° C.

EXAMPLE 5

Preparation of Rigid Polyurethane Foam

Polyurethane foams are prepared from the glycoside carbamate polyethers prepared as in Examples 2 and 4, and also from a methyl glucoside polyether polyol having a hydroxyl number of 463 and a viscosity of 120,000 cps. at 24° C. The latter, of course, affords a comparison of the properties of the glycoside carbamate polyethers of this invention with a polyol of the prior art and permits an evaluation of the effectiveness of the use of urea in the preparation of the products of this invention.

The details of the preparation of these three polyurethane resins, the time of foaming, the foam properties, and the flame retardant properties are shown in the table below. In preparing these foams, all of the ingredients except the polyisocyanate, are weighed into a cardboard container and mixed thoroughly; then, the organic polyisocyanate is weighed in and the resulting mixture agitated vigorously for the period of time shown in the table. The "cream time" is a term used to designate the length of time required for a resin to begin cellulation, as determined from initial mixing. Likewise, "foam time" is a term used to desginate the length of time required for a resin to attain maximum expansion, as determined from initial mixing. The term "cut density" refers to the density of a portion of the solid foam cut out from the interior thereof, excluding any part which is adjacent the walls of the container, and "p.c.f." denotes pounds per cubic foot as an expression of cut density. The "time to extinguish" and the "burning rate" are determined in accordance with ASTM test method 1692-67T.

In the following table, certain terms are used to designate various additives. These terms, and the additives which they described, are as follows:

Fyrol 6: O,O-diethyl-N,N-(2-hydroxyethylaminomethyl)-phosphonate
Dabco R 8020: 80% dimethylethanolamine, 20% triethylenediamine
DBTDL: dibutyltindilaurate
TMBDA: tetramethylbutane 1,3-diamine
DC-193: polydimethylsiloxane emulsifier
PAPI: polymethylenepolyphenylisocyanate
F-11B: monofluorotrichloromethane

TABLE I.—URETHANE FOAM PREPARATION AND PROPERTIES

| Polyether polyol | Foam number | | |
| --- | --- | --- | --- |
| | 1 Unmodified methyl glucoside polyether | 2 Example 4 | 3 Example 2 |
| Polyether hydroxyl no. | 463 | 470 | 624 |
| Formulation (parts by weight): | | | |
| Polyether polyol | 100.0 | 92.5 | 95.0 |
| DC-193 | 1.0 | 1.0 | 1.0 |
| Fyrol 6 (OH No. 460) | b 15.0 | 7.5 | 5.0 |
| Dabco R 8020 | 1.5 | 1.4 | 1.0 |
| TMBDA | | 0.3 | |
| DBTDL | 0.2 | 0.26 | 0.1 |
| F-11B a | 42.0 | 39.5 | 47.0 |
| PAPI | 134.5 | 125.6 | 155.2 |
| NCO/OH ratio | 1.05:1.0 | 1.05:1.0 | 1.05:1.0 |
| Phosphorus content of foam | c 0.68 | c 0.35 | c 0.20 |
| Foaming conditions, seconds: | | | |
| Mix | 15 | 8 | 15 |
| Cream time | 20 | 10 | 27 |
| Foam time | 70 | 30 | 120 |
| Foam properties: | | | |
| Cut density, p.c.f. | 1.9 | 1.8 | 1.7 |
| Dimensional stability, percent volume change at 158° F., 95% R.H., 24 hrs | +8.6 | +7.3 | +8.1 |
| Flame retardant properties ATSM 1692-67T: | | | |
| Burn extent, in. | 0.9 | 0.8 | 1.0 |
| Time to extinguish, sec | 25 | 25 | 26 |
| Burning rate, in./min | 2.1 | 1.4 | 2.3 | a F-11B content adjusted to produce 1.7 to 2.0 p.c.f. cut density.
b Polyether polyol-Fyrol 6 component of system contains 13% Fyrol 6; (12.4% phosphorus).
c Percent.

It will be noted that the glycoside carbamate polyols of this invention not only have much lower viscosities, and are accordingly more easily handled, but also produce foams with equivalent or better flame retardant properties, using much less of the relatively expensive flame retardant additive, Fyrol 6, that is required in foams prepared with the unmodified glycoside polyols of the prior art.

It will be noted also that the polyurethane foams prepared in accordance with this invention, i.e., from the products of Examples 2 and 4, provided the same degree of flame retardancy, with less phosphorus content, as the polyurethane foam prepared from an unmodified methyl glucoside polyether.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:
1. A glycoside carbamate having the formula:

$$GA_nR$$

wherein G is a non-reducing, monosaccharide glycoside residue, A is a carbamate group, $n$ is 1, 2, 3, or 4, and R is alkyl, hydroxyalkyl or aralkyl and has from 1 to 8 carbon atoms.

2. The glycoside carbamate of claim 1 wherein $n$ is 2.
3. A glycoside carbamate polyether having the formula:

$$GA_n(OR')_xR$$

wherein G is a non-reducing, monosaccharide glycoside residue, A is a carbamate group, R' is lower alkylene or aryl-substituted lower alkylene, $x$ is an integer ranging from about 4 to about 80, $n$ is 1, 2, 3, or 4, and R is alkyl, hydroxylalkyl, or aralkyl and has from 1 to 8 carbon atoms.

4. A glycoside carbamate polyether having the formula:

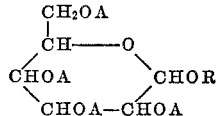

wherein R is alkyl or hydroxyalkyl and has from 1 to 8 carbon atoms, and A is hydrogen, carbamate, $(AlkO)_nH$ or $CONH(AlkO)_nH$ where Alk is lower alkylene and $n$ is an integer, at least one such A being $(AlkO)_nH$ or $CONH(AlkO)_nH$, and the sum of the $n$'s being from about 4 to about 80.

5. The glycoside carbamate polyether of claim 3 wherein R is methyl.
6. The glycoside carbamate polyether of claim 3 wherein Alk is propylene.
7. A glycoside carbamate polyether having the formula:

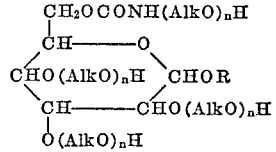

wherein Alk is lower alkylene, $n$ is 0 or an integer, the sum of the $n$'s being from about 4 to about 80 and R is alkyl, hydroxyalkyl, or aralkyl and has from 1 to 8 carbon atoms.

8. The glycoside carbamate polyether of claim 7 wherein Alk is propylene.
9. A glycoside carbamate polyether having the formula:

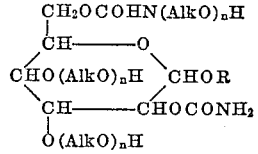

wherein Alk is lower alkylene, $n$ is 0 or an integer, the sum of the $n$'s being from about 4 to about 20, and R is alkyl, hydroxyalkyl, or aralkyl and has from 1 to 8 carbon atoms.

References Cited
UNITED STATES PATENTS
2,527,839 10/1950 Morton _____ 260—234
3,357,970 12/1967 Ulyatt _____ 260—210

JOHNNIE R. BROWN, Primary Examiner

U.S. Cl. X.R.
260—9, 77.5 AS, 234 R